Patented Nov. 21, 1939

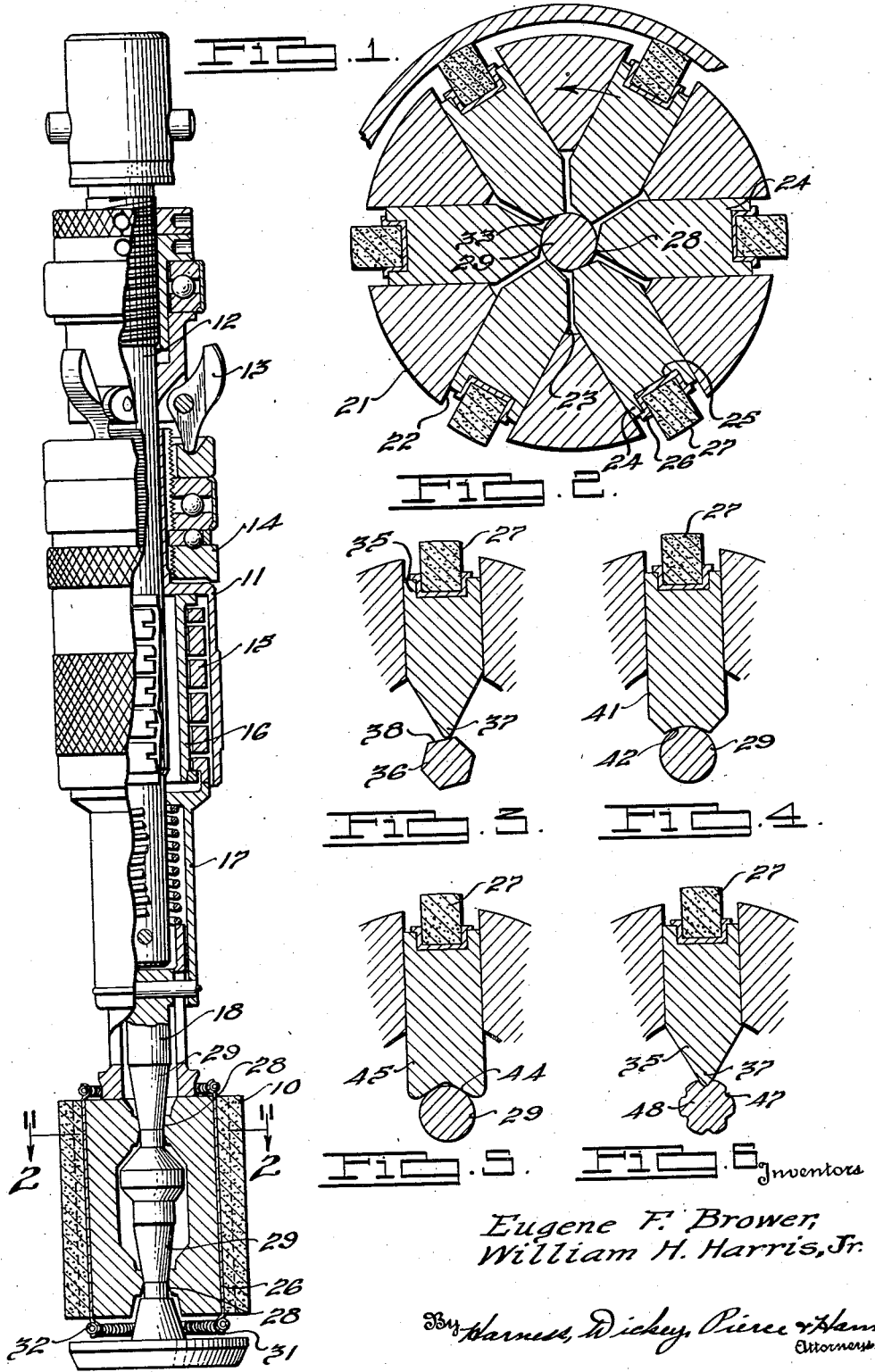

2,181,010

UNITED STATES PATENT OFFICE 2,181,010

HONING TOOL

Eugene F. Brower and William H. Harris, Jr., Detroit, Mich., assignors to Micromatic Hone Corporation, Detroit, Mich., a corporation of Michigan Application February 13, 1937, Serial No. 125,535

2 Claims. (Cl. 51—184.3)

Our invention relates to honing devices and particularly to a honing tool and to methods and means of applying a radial force to the abrading element thereof.

Difficulty has always been experienced in the honing art in obtaining a proper support for the abrading elements for adjusting them radially of the axis of the honing tool. In some instances rapid cutting was obtained while in others the surfaces of the stone became loaded and inoperative. Various attempts have been made to overcome the difficulty of producing uniform abrading conditions. It was found desirable to provide means which would prevent the loading of the stone surfaces to produce uniform cutting action. When the stone surface was broken down a very slight amount during each operation, a good cutting condition was had and the clogging or loading of the abrading surfaces was prevented.

In practicing our present invention we have obtained the breaking down of the surface of the stone through the application of a radial force to that side of the center line of the stone toward which the stone is urged due to the rotation of the abrading head. A balancing force is thereby provided which offsets the drag on the stone due to the rotation of the head and the breaking down of the stone surface occurs as a result. The cone engaging portions of the stone carriers are sloped to engage the cone which urges the carriers outwardly at a point spaced from the central radial line of the stone carrier. A snug fit is provided between the carriers and the slots in the abrading head to prevent the tilting of the carrier therein while permitting the offset application of the radial pressure.

When the carrier is disposed to fit the slot in the abrading head very closely so as to prevent tilting, the end of the carrier may be pointed to rest against the sloping surface on the expanding cone or engage in a notch therein to accurately maintain the carrier end centrally with reference to the axis of the tool. An arc may be provided on the end of the carrier on a slightly larger radius than that of the cone so that a central point engagement is produced when the radial pressure is maintained on the central line, while permitting the application of pressure to shift from the radial line to that side thereof toward which the stone is apparently forced. This same result will be produced when an angle notch is provided in the inner end of the carrier engaging the cone at two points to centralize the carrier with relation to the central axis of the tool and to shift the application of pressure to that side of the radius center line of the carrier toward which the stone is apparently dragged by the tool rotation.

In any of these arrangements, the radial force provided by the tool to the abrading element is always a balanced one, either directly applied through the central radial axis of the carrier, or shifted slightly therefrom towards the side at which pressure is built up on the stone due to the rotation of the tool. In this manner, the radial thrust of the stone is always balanced and uniform and the tilting or cocking of the stone in the slot of the holder, which heretofore occured, is eliminated. This cocking was the cause of chatter and the loading of the stone surfaces which produced very poor grinding conditions and unsatisfactorily honed surfaces.

Accordingly, the main objects of our invention are: to provide a honing tool with radially movable carriers which have the adjusting pressure so applied thereto as to counteract the tendency of the carriers to bind due to the rotation of the abrading head; to slope the cone engaging portion of the stone carriers to provide contact therewith at a point on that side of the center line of the carrier toward which the pressure on the stone is built up during the tool operation; to provide means for balancing the radial thrust on a stone carrier with the dragging force on the stone during tool operation to produce good honing conditions; to balance such forces through the central line of the stone and also, when the application of the force has shifted, on one side thereof; to provide a carrier for an abrading stone which contacts a radial thrust element in a manner to center the carrier relative to the element for normal operation and which may shift the applied load to that side of the center line of the carrier toward which the drag on the stone is being built up due to the tool operation; and in general, to provide a honing tool with an abrading head in which the pressures developed on the abrading stone during the tool operation are counteracted by the pressure applied to the abrading stones by the radial adjusting element.

Other objects and features of novelty of our invention will be specifically pointed out, or will become apparent from referring, for a better understanding of the invention, to the following description taken in conjunction with the accompanying drawing wherein:

Figure 1 is a broken view, partly in section and partly in elevation, of a honing tool embodying features of our invention;

Fig. 2 is an enlarged sectional view of the structure illustrated in Fig. 1, taken on the line 2—2 thereof;

Fig. 3 is a view of structure, similar to that illustrated in Fig. 2, showing a modified form thereof;

Fig. 4 is a view of a structure, similar to that illustrated in Fig. 2, showing a further modified form of our invention;

Fig. 5 is a broken view of structure, similar to that illustrated in Fig. 2, showing a still further form that our invention may assume, and Fig. 6 is a view of structure, similar to that illustrated in Fig. 2, showing a still further modified form of our invention.

In Fig. 1, we have illustrated a honing tool embodying an abrading head 10 and an adjusting head 11. The adjusting head is similar to that illustrated and described in the patent to F. J. Jeschke, No. 1,944,660, issued January 23, 1934, and assigned to the assignee of the present invention. The adjusting portion of the tool embodies a spindle 12 by which the tool is driven in rotation and reciprocated. A plurality of fingers 13 are movable to provide for the contraction of the abrading head 10 so that it may be inserted and removed from a cylinder without touching and marring the walls thereof. Adjustment may be provided to control the degree of expansion of the head by the nut 14 which provides for the amount of deflection of a spring 15 disposed within a cage 16. When the fingers 13 are collapsed the pressure is released from the spring 15 as it is engaged by the cage 16 and no pressure is then applied through the thrust element 17 to the cone supporting shaft 18. When the fingers are pressed inwardly the spring 15 is compressed and pressure is exerted through the thrust element 17 to the cone carrying element 18 which may be moved axially. The degree of movement is limited by the cylinder wall or by the cage 16 which limits expansion of the spring, the degree of which movement is controlled through the adjustment of the nut 14.

The abrading head 10 comprises a body 21 having a plurality of slots 22 therein communicating with a central cylindrical aperture 23. The stone carriers 24 are disposed in the slots and are provided on the outer surface with a channel recess 25 for receiving and retaining the backing element 26 to which an abrading element 27 is secured. From Fig. 1, it will be noted that the carriers are supported at each end through the engagement of the projections 28 with a pair of spaced cones 29 formed on the cone carrying element 18. The ends of the backing element 26 are provided with hooks 31 which are encompassed by a garter spring 32 for biasing the abrading elements and carriers toward the cones 29. The axial movement of the element 18 causes the radial movement of the carriers and stones.

In Fig. 2, we have illustrated the inner edges of the projections 28 of the carriers 24 as being sloped as at 33. This sloping surface is so disposed as to provide contact between the cones 29 and the carriers at a point on that side of the center line of the carriers toward which thrust is imparted to the abrading element 27 by the drag occurring due to the rotation of the tool in the opposite direction. In this manner, the force on the stone surface is balanced by the thrust provided by the cone which counteracts the tendency of the carrier to tilt and bind in the slot. A very close fit is preferably provided between the carrier and the walls of the slot 22 to prevent such tilting, but the tendency to produce such tilting is found to actually bind and prevent a free operation of the elements. This causes the chattering of the stones on the wall of the cylinder and the surface of the stone to become loaded. By permitting the thrust between the cones 29 and the carriers to occur on the side toward which the drag on the stone occurs, the forces are balanced and the free movement of the carrier is thereby permitted. As a result, it was found that the desired breakdown of the surface of the stone occurs and the chattering and loading of the surface is thereby prevented.

In Fig. 3, we have shown a further form of engagement which may successfully be employed between a carrier 35 and a thrust element 36. In this instance an apex is provided on the projection 28 on the center line of the carrier which engages a sloping surface 38 on the thrust element 36. The forces between the stone surface and the thrust element are initially balanced, and in case a drag should occur on one or the other side of the center line, the force will be counteracted through the shifting of the apex 37 on the sloping surface 38 to thereby maintain the free movement of the carrier in the slot.

A further form of my invention is illustrated in Fig. 4 wherein a carrier 41 has an arcuate surface 42 on the projection 28 thereof which has a larger radius than the radius on the conical element 29. Initially the forces are balanced and as soon as an unbalanced condition occurs, the application of the force between the carriers 28 and cones 29 shifts to produce a balanced condition. Should the drag on the stones occur to the right, as viewed in Fig. 4, the contact between the surfaces 42 and the conical elements 29 would likewise shift to the right and thereby balance the drag and permit the free movement of the carrier in the slot.

In Fig. 5, we have shown a similar structure wherein an angle notch 44 is provided in a carrier 45 having engagement with a conical element 29. This structure operates in the same manner as that of Fig. 4 to balance the forces produced between the cylinder wall and the abrading stones and between the carriers 28 and the cones 29. Should the force tend to move the abrading stones to the right, as viewed in the figure, the thrust between the cone 29 and the notch 44 would also shift to the right to balance the force and permit the free movement of the carrier 45 in the slot.

A similar arrangement is illustrated in Fig. 6 wherein an apex end 37 on a carrier 35 is engaged in a notch 47 in a conical element 48 to retain the apex at all times on the central radial line through the carrier 35. Since the carrier cannot tilt, it is only a question of balancing the force applied to the surface of the stone the tendency of the stone to shift to one or the other side of the center line will be offset by the application of the force directly through the central line by the cone due to the notch engagement therewith.

Any of the structures herein illustrated and described prevents the binding of the carriers in the slots and permits their free radial movement. The balancing of the forces between the cones and the carriers and the abrading elements and the cylinder wall prevents the tilting of the stones and their binding in the slot. As a result, the free movement of the elements in the slot at all times permits the breaking down of the surface of the stone sufficiently to prevent the loading of the surface and to thereby present sharp cutting surfaces to the wall of the cylinder.

While we have described and illustrated several embodiments of our invention, it will be apparent to those skilled in the art that various changes, omissions, additions, and substitutions may be made therein without departing from the spirit and scope of our invention as set forth in the accompanying claims.

What is claimed is:

1. A honing tool, including, in combination, an abrading head, radially disposed abrading elements in said head, carriers in said head engaging said elements having their medial planes disposed on radial lines of said head, projections on the opposite side of said carriers, a member engaging said projections on that side of the medial planes of the carrier toward which the elements are urged due to the rotation of the tool.

2. A honing tool, including, in combination, an abrading head, abrading elements, carriers for said elements mounted in said head and having their medial planes disposed radially in said head, a cone engaging said carriers, said carriers having the cone engaging portion so constructed as to contact said cone at a point spaced from said radial plane on one side of said plane at both ends of said carriers.

EUGENE F. BROWER.
WILLIAM H. HARRIS, Jr.